United States Patent [19]

Fujiwara et al.

[11] 4,302,372
[45] Nov. 24, 1981

[54] NON-FIRED SILICON CARBIDE REFRACTORIES

[75] Inventors: Shigeru Fujiwara; Masayosi Nagahara; Satoshi Nagai; Toshihiro Isobe, all of Himeji, Japan

[73] Assignees: Nippon Steel Corporation, Tokyo; Harima Refractory Co. Ltd., Takasago, both of Japan

[21] Appl. No.: 78,966

[22] Filed: Sep. 26, 1979

[30] Foreign Application Priority Data

Sep. 26, 1978 [JP] Japan .................................. 53-118432

[51] Int. Cl.³ .............................................. C04B 35/56
[52] U.S. Cl. ..................................... 260/29.3; 423/345; 260/29.6 XA; 260/29.6 H; 260/29.2 E; 260/38; 260/39 M; 260/40 R; 260/42.11; 501/88
[58] Field of Search .......................... 106/44; 423/345; 260/29.3, 38, 42.11

[56] References Cited

U.S. PATENT DOCUMENTS 4,123,286 10/1978 Coppola et al. ..................... 106/44
4,133,689 1/1979 Stroke ................................... 106/44

OTHER PUBLICATIONS

Bell, W. C., "An Introduction to the Vibratory Compaction of Powders" from *Ceramic Fabrication Processes*, Published Jointly by Technology Press of MIT and John Wiley and Sons, Inc., New York, pp. 74–77.

*Primary Examiner*—O. R. Vertiz
*Assistant Examiner*—Mark Bell
*Attorney, Agent, or Firm*—Cushman, Darby & Cushman

[57] ABSTRACT

A non-fired silicon-carbide base refractory mixture comprising 95 to 99.5% (in respect to the mixture) of silicon carbide containing 1.5 to 8% (in respect to the silicon carbide) of particles not larger than 1μ and 0.5 to 5% of super-fine silica powder containing at least 50% of particles not larger than 1μ after a coagulation.

4 Claims, 3 Drawing Figures

NON-FIRED SILICON CARBIDE REFRACTORIES

BACKGROUND OF THE INVENTION

1. Field of the Invention

The present invention relates to silicon carbide refractories suitable for preparing large size blocks having a low porosity and a high strength, a volume stability at high temperature and showing an excellent resistance to thermal impacts.

2. Description of Prior Art

Conventionally it has been difficult, except for certain types of refractories, such as carbon blocks, to prepare large shapes of refractories, for example, 2 m cubic blocks, due to limitations in production equipments, such as the total available pressure of a forming press to be used, the size and strength of a mold, as well as limitations in material properties and nature, such as crackings or deformations of refractory bricks due to their expansion and contraction during their firing process or during their services at largely varying temperatures.

Meanwhile, extensive studies have been made for many years on construction of various ovens and furnaces with unshaped refractories, such as by casting installation of castable refractories and pneumatic ramming of plastic refractories for obtaining large unit shapes. However, all refractories products obtained by these prior arts show a high porosity amounting to 15% or larger. Therefore, their strength during actual services is low and their structure is low in density. These prior arts have a further disadvantage that the intergranular vacancy in the casting or rammed shapes is increased, hence their bonding strength is lowered, because the castable refractories are given excessive water to render the casting workability easy, or plastic material, such as raw clays, are added to the plastic refractories to provide sufficient plasticity.

Further, in the case of unshaped refractories, relatively large amounts of organic and inorganic bonding materials are added for the purpose of obtaining required strength, and these large amounts of bonding materials provide main causes for a lowered fusion point, deterioration of corrosion resistance, and lowered alkali resistance in the resultant products.

In other words, it has been an ultimate object in production of all refractory structures to obtain a unitary large shape having a dense structure and free from crackings caused by non-uniform distribution of stress even under repeated services exposed to large temperature changes.

Up to now, however, large shapes of refractories having a dense structure with porisity less than 15% and less susceptible to crackings and deformations and having a stability in their volume have never been obtained.

SUMMARY OF THE INVENTION

Therefore, one of the objects of the present invention is to provide silicon carbide non-fired refractories suitable for preparing large shapes without the disadvantages of the prior arts.

The silicon carbide non-fired refractories according to the present invention are prepared by adjusting the particle size of silicon carbide raw material with less expansion and contraction and less wettability in contact with molten metal. As first step, the formulation of silicon carbide is prepared as same grain size as in usual process of refractories, and further subjecting the material to a secondary particle size adjustment in which super-fine silicon carbide powder is mixed with super-fine silica powder in an optimum range so as to increase the compactness among the fine particles, whereby the above two kinds of super-fine particles are caused to fill the very small vacancy and the coagulating force of the super-fine particles at the time of water addition is utilized to enable preparation of large refractory shapes having a low porosity and stability in volume.

More specifically, according to the present invention the silicon carbide base material (silicon carbide and silicon dioxide powder, for example is subjected to the particle size adjustment so as to obtain a mixture of coarse, medium, and fine particles having a desired degree of density, and super-fine silicon carbide powder containing 30% or more of particles not larger than $1\mu$ is added to the fine particle fraction so as to obtain a silicon carbide material containing 1.5 to 8% of particles not larger than $1\mu$ and 95 to 99.5% of this silicon carbide material is mixed with 0.5 to 5% of super-fine silica powder containing not less than 50% of $1\mu$ or smaller particles after the coagulation (measured by sedimentary Andreasen method) so as to obtain silicon carbide non-fired refractories having a uniform low porosity.

According to a modification of the present invention, 0.5 to 4% of metallic silicon and 0.3 to 4% of a thermoplastic resin containing a thermal curing agent are added to 100% of the above prepared mixture so as to improve the physical properties.

The present invention will be described in more detail referring to the attached drawings.

DETAILED DESCRIPTION OF THE INVENTION

Figure 1A:
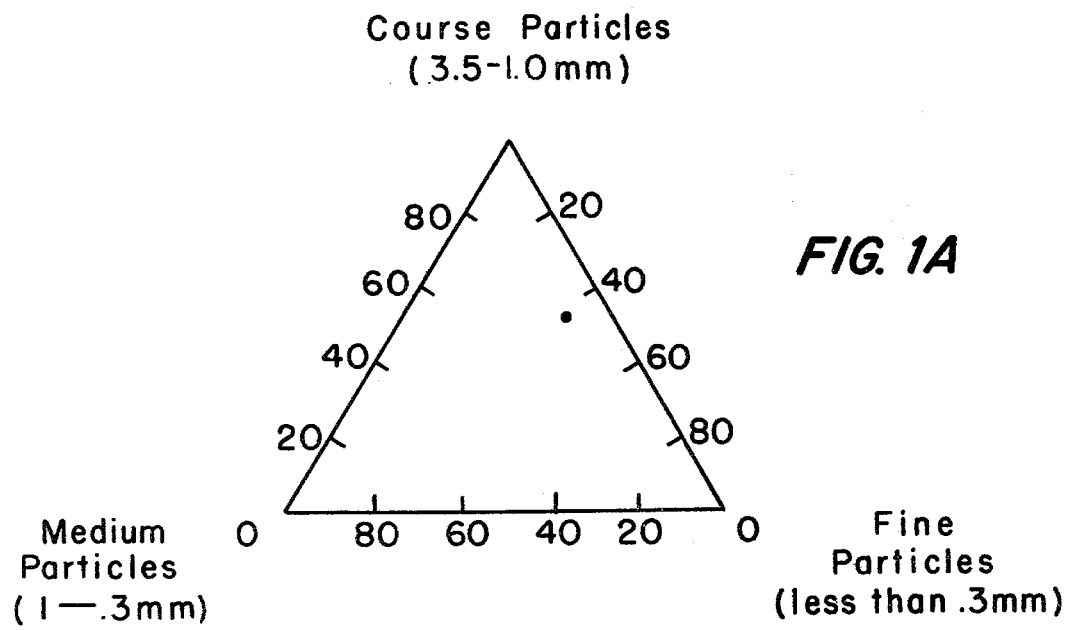
FIG. 1A shows a triangle diagram representing proportions of the coarse particles, the medium particles and the fine particles and FIG. 1B a triangle diagram representing proportions of the super-fine silicon carbide powder and the super-fine silica powder added to the fine particles fraction.

In the present invention, silicon carbide is used as a main constituent, because it shows less expansion and contraction, is less susceptible to the wettability by molten metal, and has excellent resistance to corrosion and alkali. In order to fully develop the excellent properties of the silicon carbide, 75% or higher purity, preferably 80% or higher purity of silicon carbide is used and at least 95% or more of the refractories is occupies by such high purity silicon carbide.

The reason for adding $1\mu$ or smaller particles of silicon carbide is that it co-works with the super-fine silica powder to increase the strength by reducing the porosity, and to enhance the resistance to alkali under a high temperature condition at 1000° to 1200° C. When the content of the $1\mu$ or smaller silicon carbide particles is less than 1.5% or larger than 8%, the porosity increases, the strength lowers, and the resistance to alkali at 1000° to 1200° C. cannot be improved.

Further, super-fine silicon carbide powder is added because it can compensate the lowering of strength at 1200° C. or higher caused by the addition of super-fine silica powder as described hereinbelow.

The reason for addition of the super-fine silica powder ($SiO_2$ 85% or larger) containing 50% or more of the 1μ or smaller particles after the coagulation is that it enhances the compaction among the fine particles of silicon carbide, further lowers the porosity by its coagulation, and it improves hot strength at temperatures ranging from 600° to 1000° C. When the content of the super-fine silica powder is less than 0.5%, the desired result cannot be obtained, and on the other hand, when the content exceeds 5%, the hot strength at temperatures about 1200° C. or higher lowers and the resistance to alkali also lowers.

Another reason for addition of the super-fine silica powder is that it exhibits more remarkable effects for lowering the porosity than the addition of super fine silicon carbide powder.

The reason for adding the metallic silicon and the thermoplastic resin containing a thermal curing agent to the mixture having the particle proportions as mentioned above is that the metallic silicon reacts at about 1100° C. or higher with active carbon produced by decomposition of the resin under a reducing atmosphere to produce $\beta$-SiC, thus providing a strong resistance to alkali and markedly improving the hot strength. The metallic silicon should be added in a range from 0.5 to 4%, and if the addition is less than 0.5%, no desired result can be obtained and on the other hand, if the addition is beyond 4%, no proportional improvement can be obtained only with economical disadvantages.

As mentioned before, the thermoplastic resin containing a thermal curing agent is added for the purpose of remarkably improving the strength of the formed product at lower temperatures ranging from 150° to 600° C. under the reducing atmosphere after the forming, in addition to the improvement of the resistance to alkali by the bonding between the active carbon and the metallic silicon. In this case when the addition of the resin is less than 0.3%, no desired result can be obtained, and on the other hand, when it is beyond 4%, the porosity is increased by loss of the volatile matters in the resin at high temperaures.

The reasons for limiting the contents of various components of the refractories according to the present invention have been set forth above.

To describe the present invention in summary, advantageous properties of all the four main components, namely the super-fine silicon carbide powder, the super-fine silica powder, the fine metallic silicon powder and the thermoplastic resin, preferably a novolac type phenol resin powder are efficiently utilized, and also synergetic effects by the combination of these materials are fully developed for preparing silicon carbide refractories suited for large refractory blocks with lowered porosity and high strength, a volume stability under high temperatures and with excellent resistance to thermal impacts.

For the purpose of reducing the addition of water, lowering the porosity, and providing the dense structure, the super-fine silica powder plays a main role, and the super-fine silicon carbide powder makes up the role of the super-fine silica powder. When the super-fine silica powder is added in appropriate amounts, the water addition can be saved by 2 to 4%, and hence the porosity is lowered by 5 to 10% corresponding to the save of the water addition. However, if the silica powder is added excessively, the viscosity of the mixture increases, thus requiring increased addition of water and increased porosity, and the resultant products are susceptible to local fusion at 1200° C. or higher and to lowering of the strength.

Meanwhile, the super-fine silicon carbide powder moderates the limitation of the addition of super-fine silica powder, thus assuring a satisfactory hot strength at 1200° C. or higher.

Further, the novolac type phenol resin which has been cured by condensation due to heat treatment at temperatures ranging from 130° to 170° C. provides the strength in the temperature range from the room temperature to 800° C. by bonding with carbon under a reducing atmosphere, and the strength in the temperature range from 600° to 1100° C. is provided by the coagulation of the super-fine silica powder, and the strength in the temperature higher than 1100° C. is provided by formation of $\beta$-SiC by reaction of the carbon generating from the resin with the metallic silicon. Thus the integrated effects of these materials determine the general properties of the refractories according to the present invention.

For preparing the materials for obtaining the refractories according to the present invention, the silicon carbide which constitutes the main component of the refractories is prepared into a coarse particle fraction and an intermediate particle fraction and a fine particle fraction so as to determine an optimum particle size for compaction as shown in FIG. 1A.

In order to enhance the compaction in the fine particle fraction, super-fine silicon carbide powder mostly not larger than 3μ and containing at least 30% of not larger than 1μ particles (FIG. 2) and super-fine silica powder having a maximum grain size of 3μ and containing at least 50% of not larger than 1μ particles (FIG. 2) are admixed to the silicon carbide material is prepared above (FIG. 1, B).

As for the thermoplastic resin used in the present invention, one or more of novolac type phenol resin, polyester resin, polyethylene resin, polysthylene resin, vinyl acetate resin, polyvinyl chloride resin, etc. may be used.

As for the thermal curing agent, one or more of hexamethylenetetramine, paraformaldehyde, trioxymethylene, formaldehyde resin, resol type phenol resin, aniline resin, sulfoneamide resin, cresol resin, xylene resin, etc. may be used. However, phenol resins, particularly the novolac type phenol resin is more effective for the thermoplastic resin, and hexamethylene tetramine and resol type phenol resin are more effective for the thermal curing agent. In general, the thermoplastic resin increases the porosity after firing so as to have the low residual carbon content after thermal decomposition by heating under a reducing atmosphere.

The reason why the phenolic resin, such as phenol, synthetic phenol, xylene and cresol, is more effective as the theremoplastic resin used in the present invention are that these phenolic resins contain a benzene ring in their molecular structure, have a high C/H ratio, maintain about 50% residual carbon content after thermal decomposition by heating under a reducing atmosphere, and have a strong bonding power with carbon. It is desirable for obtaining the desired strength after drying that both the thermoplastic resin and the thermal curing agent are as fine as possible, and particles not larger than 74μ are particularly effective.

As in general a liquid resin has high viscosity, a large amount of liquid resin must be used in order to obtain a suitable flowability, and this increased amount of liquid resin tends to increase the porosity after the firing, thus lowering the strength. In order to avoid the increased porosity caused by the increased amount of liquid resin, and also to avoid coarse compaction caused by a high liquid viscosity, particularly in the case of a vibration forming process, the thermoplastic resin is used in the form of powder.

Meanwhile, a dispersing agent, such as water, oil, ethyleneglycol, higher alcohols, liquid resin and tar, may be used for general purposes. However, if the viscosity of the dispersing agent is high, a large amount of liquid is required for a workable flowability, and this increased amount of liquid increases the porosity after firing, thus lowering the strength. Therefore, it is necessary to select a low viscosity dispersing agent. Among the above mentioned agents, water shows the lowest viscosity, thus giving a workable flowability with small amount, and is most effective for increasing the compaction of the formed products. Also, water has no color nor odor, and is a stable substance which does not react with the silicon carbide material. Thus, water is the most suitable dispersing agent.

The non-fired silicon carbide refractories according to the present invention can be selectively used for constructing walls of relatively large furnaces, such as blast furnaces, soaking pits, and heating furnaces in the steel industry.

DESCRIPTION OF PREFERRED EMBODIMENTS

The present invention will be better understood from the followed preferred embodiments.

As shown in Table 1, six types of mixtures were prepared, and molded in molds of 40×40×160 mm, under vibration to prepare test pieces. These test pieces were measured regarding the porosity, the hot modulus of rupture, and the linear change according to Japanese Industrial Standard (JIS R2554). The results are shown also in Table 1.

The mixtures 1 to 3 prepared according to the present invention, in contrast to the comparative mixture 5, enable the formation with less water content, lower the porosity after drying and reduction firing at 1200° C., and improve the hot strength at temperatures from 800° to 1200° C. as shown in Table 1. Also the mixtures 2 and 3 according to the present invention from β-SiC by the reaction between the metallic silicon and carbon deriving from the resin and thereby provide further improved hot strength at 1200° C. As illustrated by the comparative mixture 6 in which liquid resin is used, 10% liquid resin is added so as to obtain a workable flowability, and yet the contraction rate after the reduction firing at 1200° C. is as high as −0.71% and the porosity exceeds 30%.

In order to determine the resistance to alkali by an alkali testing, the same mixtures as above were molded in a mold of 20×20×60 mm under vibration and dried at 150° C. to prepare test pieces No. 1 to No. 6.

The above test pieces were immersed in cases filled with a mixture of potassium carbonate and coke breeze in a proportion of 1:4 and subjected to repeated five cycles of firing, each at 1200° C. for 5 hours, to determine the linear change and the hot modulus of rupture of the test pieces.

As shown in Table 2, the mixtures 1–3 according to the present invention provide remarkably improved hot strength after the alkali testing as compared with the comparative mixtures 4 and 5. In the case of the mixtures 2 and 3 according to the present invention in particular, β-SiC is formed by the reaction between the metallic silicon and the carbon deriving from the resin so that the hot strength after the alkali testing is further improved and the resistance to alkali is also enhanced.

Then, tests were conducted to determine the porosity and the distribution of pores in large blocks prepared from the refractories according to the present invention. For the testing, the same mixtures are above were molded in a large mold of 2 m (length)×1.3 m (width)×0.6 m (height) under vibration to obtain shapes which were dried at 110° C. for 48 hours, and divided into 27 pieces of equal volume.

As shown in Table 3, the test pieces 1 to 3 prepared from the mixture according to the present invention show not only a lowered porosity but also a uniform distribution of pores all through the large blocks with very little local distribution, as compared with the comparative products 4 to 6.

TABLE 1

| | | | Mixtures and Physical Properties | | | | | |
|---|---|---|---|---|---|---|---|---|
| | | | Test Pieces | | | | | |
| | | | Present Invention | | | Comparative | | |
| | | | 1 | 2 | 3 | 4 | 5 | 6 |
| Particle size distribution of SiC in formulation % | | 35–1mm (a) | 50 | 50 | 50 | 50 | 50 | 50 |
| | | 1–0.3mm (b) | 10 | 10 | 10 | 10 | 10 | 10 |
| | | 0.3mm or smaller (c) | 37 | 35 | 39 | 40 | 37 | 35 |
| | Distribution of particles not larger than 0.3mm | 0.3mm–1μ (d) | 33 *82.5 | 32.2 *80.5 | 33 *82.5 | 40 *100 | 37 *92.5 | 32.2 *80.5 |
| | | not larger than 1μ (e) | 4 *10.0 | 2.8 *7.0 | 6 *15.0 | | 2.8 | *7.0 |
| Super-fine silica powder containing 50% or more of not larger than 1μ particles (%) (f) | | | 3 *7.5 | 5 *12.5 | 1 *2.5 | 3 | *7.5 5 | *12.5 |
| Metallic silicon (%) | | | | (1) | (2) | | | (1) |
| Powder novolac type phenol resin (%) | | | | (2) | (2) | | | |
| Liquid novolac type phenol resin (%) | | | | | | | | (10) |
| Hexamethylenetetramine (thermal curing agent (%) | | | | (0.18) | | | | (0.9) |
| Powder resol type phenol resin (thermal curing agent) (%) | | | | | (1) | | | |
| Water (%) | | | (4) | (5) | (5) | (8) | (6) | |
| Porosity | After drying at 150° C. | | 12.7 | 13.7 | 13.8 | 20.6 | 16.5 | 14.5 |

TABLE 1-continued

Mixtures and Physical Properties

| | | Test Pieces | | | | | |
|---|---|---|---|---|---|---|---|
| | | Present Invention | | | Comparative | | |
| | | 1 | 2 | 3 | 4 | 5 | 6 |
| (%) | After firing at 1200° C. | 12.8 | 14.0 | 14.8 | 21.3 | 17.1 | 30.1 |
| Hot modulus | After reduction firing at 800° C. | 105 | 171 | 179 | 35 | 81 | 86 |
| of rupture | After reduction firing at 1,000° C. | 117 | 180 | 183 | 30 | 87 | 101 |
| (kg/cm$^2$) | After reduction firing at 1,200° C. | 102 | 157 | 168 | 41 | 76 | 111 |
| Linear | After drying at 150° C. | −0.02 | −0.03 | −0.03 | −0.07 | −0.04 | −0.05 |
| change (%) | After reduction firing at 1,200° C. | −0.06 | −0.06 | −0.07 | −0.08 | −0.06 | −0.71 |

Figure 1B:
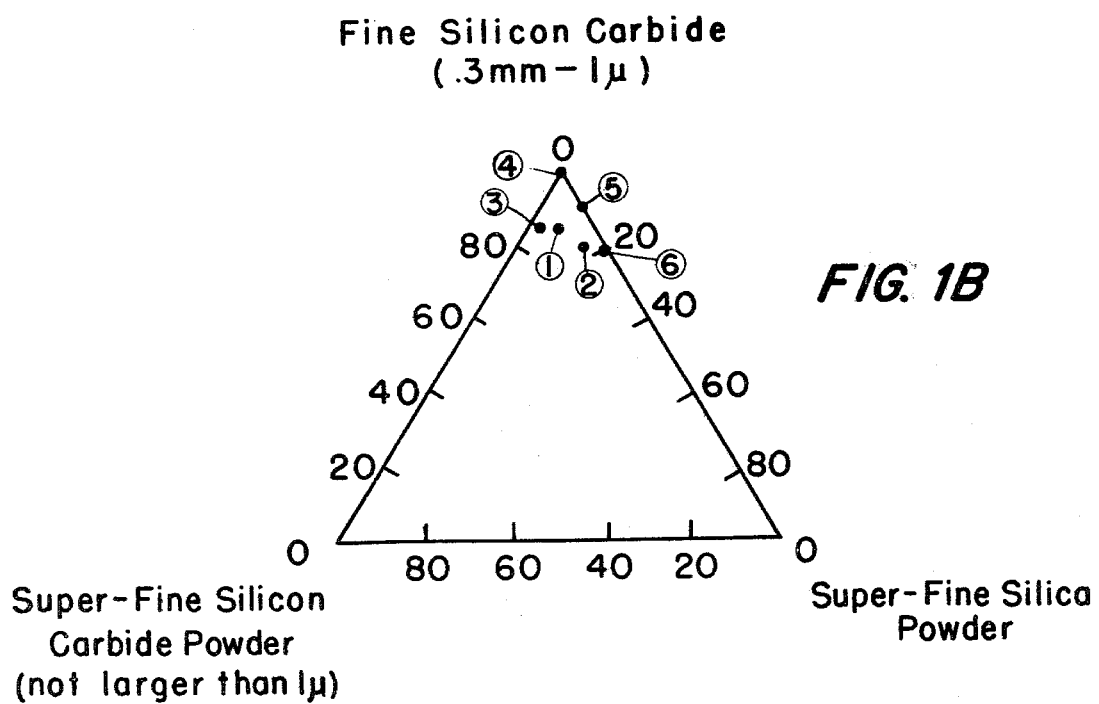
Figure 2:
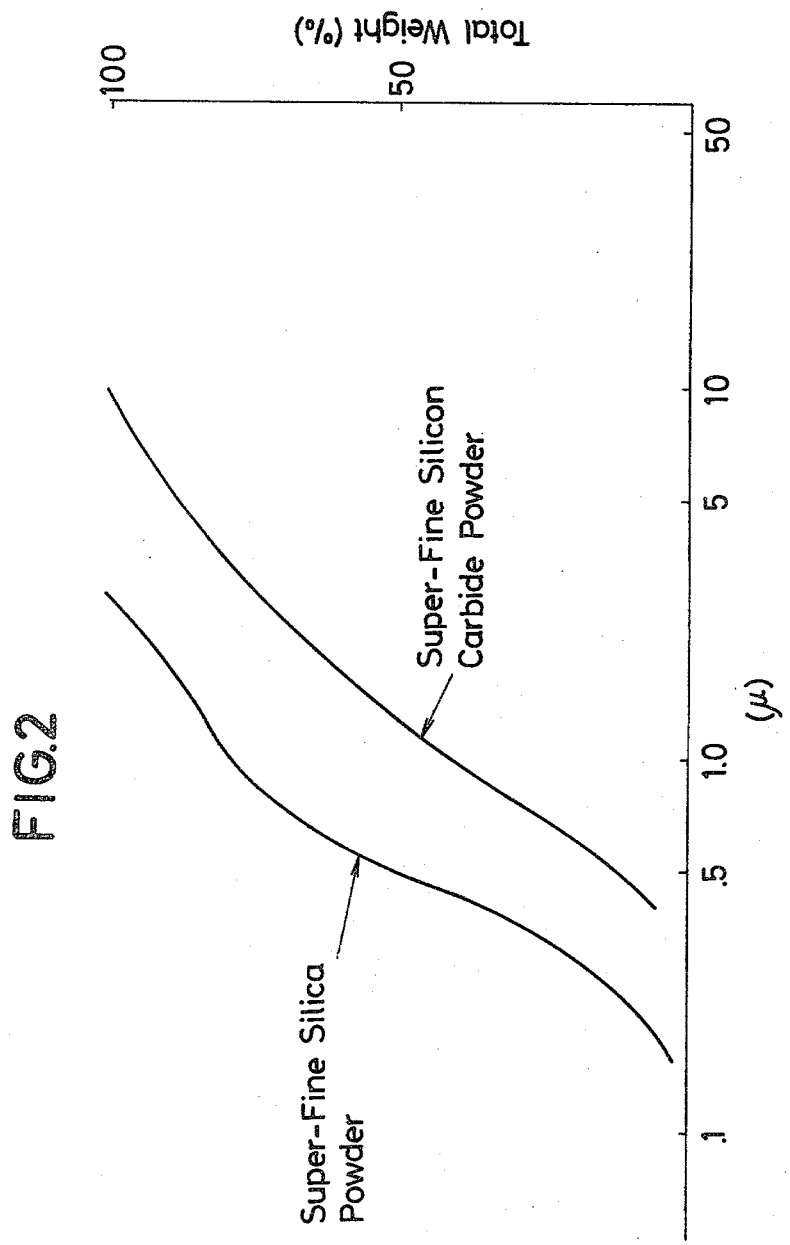
FIG. 2 is a graph showing proportions of the super-fine silicon carbide powder and the super-fine silica powder in the frefractory mixture according to the present invention.

1. The numerical figures in parentheses represent exclusive percentages.
2. The figures marked with * represent the percentages against the total amount of (d), (e) and (f), and are shown in FIG. 1(B).
3. (a) + (b) + (c) + (f) → 100
   (d) = (c) − (e)
   (d) + (e) + (f) → 100% (each of (d), (e) and (f) represents the percentage marked with *)
4. FIG. 1(A) represents the particle distribution of silicon carbide base material (Silicon Carbide and Silica Powder).
FIG. 1(B) shows the particle distribution of the fine silicon carbide powder (.3mm–1μ), the super-fine silicon carbide powder (not larger than 1μ) and the super-fine silica powder.

TABLE 2

Alkali Testings

| | | Test Pieces | | | | | |
|---|---|---|---|---|---|---|---|
| | | Present Invention | | | Comparative | | |
| | | 1 | 2 | 3 | 4 | 5 | 6 |
| Linear Charge (%) | After one firing at 1,200° C. for 5 hrs. | −0.08 | 0 | +0.01 | −0.08 | −0.11 | −0.68 |
| | After two firings at 1,200° C. for 5 hrs. | −0.10 | +0.04 | +0.03 | −0.05 | −0.09 | −0.65 |
| | After three firings at 1,200° C. for 5 hrs. | +0.30 | +0.09 | +0.07 | −0.01 | −0.09 | −0.64 |
| | After four firings at 1,200° C. for 5 hrs. | +0.35 | +0.10 | +0.15 | +0.01 | −0.06 | −0.60 |
| | After five firings at 1,200° C. for 5 hrs. | +0.47 | +0.12 | +0.19 | +0.01 | −0.08 | −0.60 |
| Hot Modulus Rupture (kg/cm$^2$) | After one firing at 1,200° C. for 5 hrs. | 82 | 196 | 191 | 39 | 46 | 101 |
| | After two firings at 1,200° C. for 5 hrs. | 77 | 190 | 198 | 34 | 45 | 103 |
| | After three firings at 1,200° C. for 5 hrs. | 70 | 175 | 203 | 42 | 41 | 104 |
| | After four firings at 1,200° C. for 5 hrs. | 63 | 201 | 199 | 30 | 28 | 110 |
| | After five firings at 1,200° C. for 5 hrs. | 55 | 203 | 200 | 29 | 32 | 109 |

TABLE 3

Porosity and Its Distribution in Large Blocks

| | | Test Pieces | | | | | |
|---|---|---|---|---|---|---|---|
| | | Present Invention | | | Comparative | | |
| | | 1 | 2 | 3 | 4 | 5 | 6 |
| Porosity (%) | Maximum | 15.1 | 15.2 | 15.1 | 23.0 | 18.4 | 16.8 |
| | Minimum | 12.3 | 13.1 | 13.3 | 18.5 | 15.1 | 14.0 |
| | Average (N = 27) | 13.9 | 14.0 | 14.2 | 20.1 | 16.6 | 15.1 |

What is claimed is:

1. A non-fired silicon-carbide base refractory mixture consisting essentially of 95 to 99.5% (in respect to the mixture) of silicon carbide containing 1.5 to 8% (in respect to the silicon carbide) of particles not larger than 1μ and 0.5 to 5% of super-fine silica powder containing at least 50% of particles not larger than 1μ after a coagulation.

2. A non-fired silicon-carbide base refractory mixture consisting essentially of 95 to 99.5% (in respect to the mixture) of silicon carbide containing 1.5 to 8% (in respect to the silicon carbide) of particles not larger than 1μ and 0.5 to 5% of super-fine silica powder containing at least 50% of particles not larger than 1μ after a coagulation, said mixture also including 0.5 to 4% of metallic silicon and 0.3 to 4% of thermoplastic resin powder containing a thermal curing agent, both percentage being per 100% of the mixture.

3. A non-fired silicon-carbide base refractory mixture according to claim 2, in which the thermoplastic resin powder is a novolac type phenol resin.

4. A non-fired silicon-carbide base refractory mixture according to claim 2, in which the thermoplastic resin powder has a particle size not larger than 74μ and water is contained as a dispersing agent.

* * * * *